United States Patent [19]
Liebetrau

[11] Patent Number: 4,597,698
[45] Date of Patent: Jul. 1, 1986

[54] WALL STRUCTURE FOR MACHINE ENCLOSURES

[76] Inventor: Richard E. Liebetrau, 237 Petrie Rd., Cadillac, Mich. 49601

[21] Appl. No.: 612,479

[22] Filed: May 21, 1984

[51] Int. Cl.[4] .............................................. B23C 9/00
[52] U.S. Cl. ..................................... 409/134; 51/272;
52/314; 83/545; 160/352; 184/106; 269/15; 408/710
[58] Field of Search .................. 409/134, 254; 52/764, 52/474, 234, 314, 272; 408/710; 83/545, 546; 51/268, 272, 274; 29/DIG. 56, DIG. 59, DIG. 99, DIG. 94; 82/34 R; 184/106, 6.27; 74/608, 609; 126/202; 160/352; 135/105; 269/15

[56] References Cited
U.S. PATENT DOCUMENTS

| | | | |
|---|---|---|---|
| 1,047,571 | 12/1912 | Sadler | 51/272 |
| 1,327,799 | 1/1920 | Beede | 269/15 |
| 1,751,807 | 3/1930 | Ford | 160/352 |
| 3,121,977 | 2/1964 | Bersudsky | 52/314 |
| 4,164,108 | 8/1979 | Ortmanns | 52/764 X |

Primary Examiner—Douglas D. Watts
Attorney, Agent, or Firm—Bachman & LaPointe

[57] ABSTRACT

A transparent enclosure for automatic metal shaping machinery effective to contain cutting fluids, chips, shavings, broken tools and the like having a smooth planar interior wall surface for shedding readily chips, fluids and other matter striking the wall during the course of machine operation.

7 Claims, 6 Drawing Figures

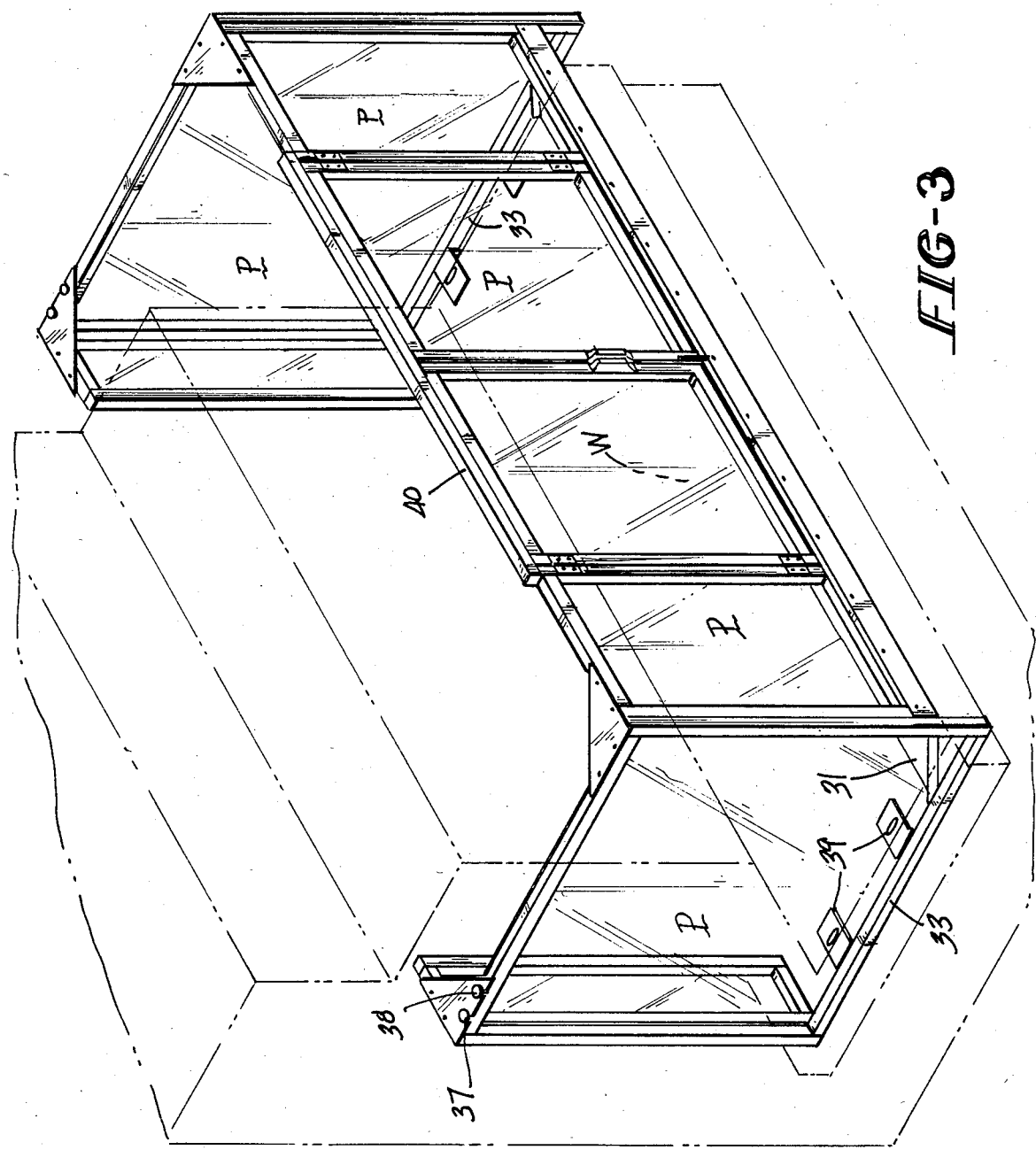

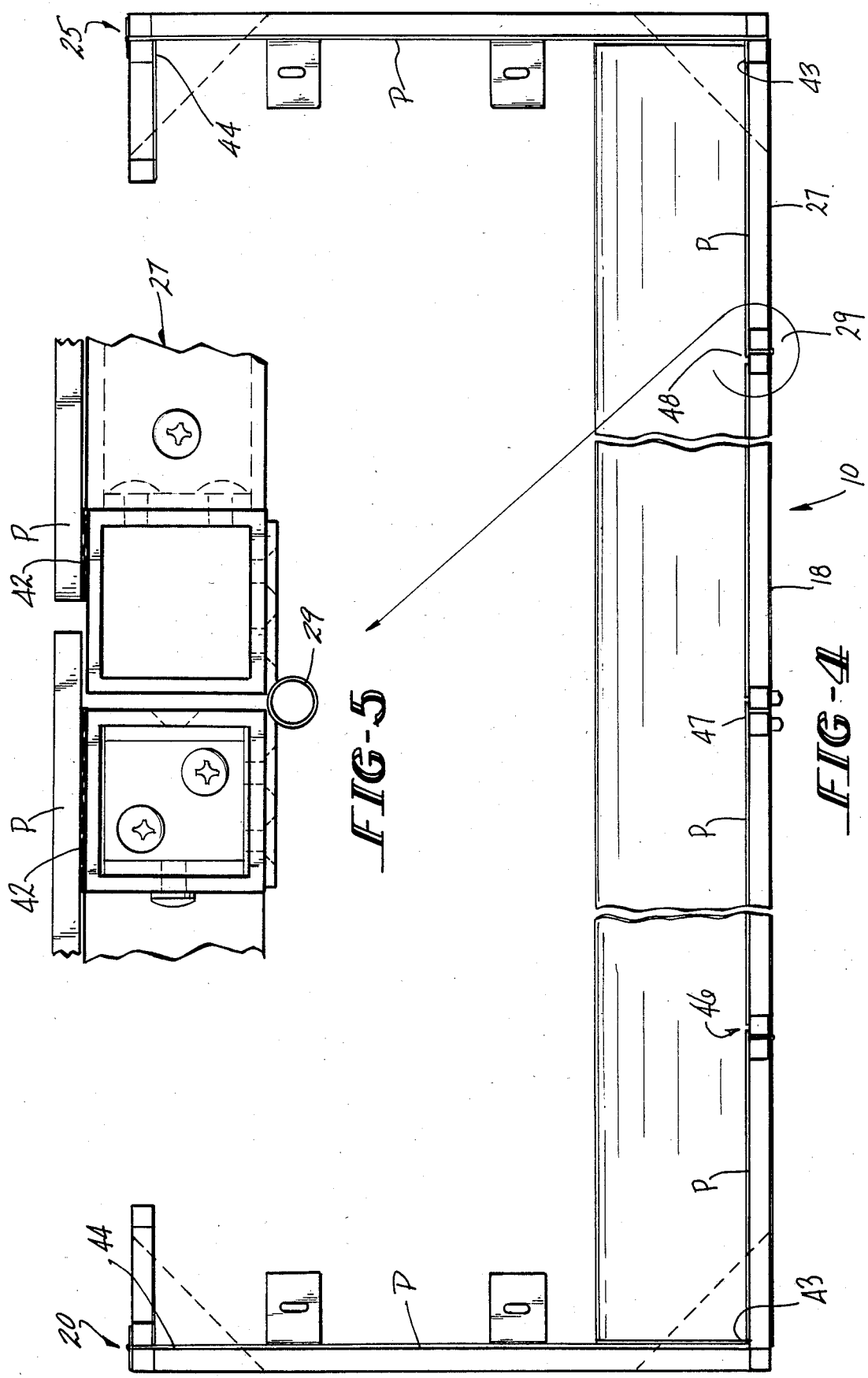

WALL STRUCTURE FOR MACHINE ENCLOSURES

BACKGROUND OF THE INVENTION

The present invention relates to machine enclosures of the type utilized to contain and collect cutting fluids and solid metallic chips and the like spewed about during the course of operation of automatic metal forming machines.

In particular the invention relates to a novel interior wall or panel structure for such an enclosure which is substantially free of offsets, shelves and other undesirable surface irregularities which impede shedding of cutting fluid and flying chips to the bed of the machine for reclaiming or recycling.

The invention also relates to improvements in enclosures of the class described which provide visual inspection, impact resistance, easy access, lightweight, an increased measure of soundproofing as well as retention of cutting fluids and chips.

Prior art enclosures and panel structures over which the present invention is an improvement are disclosed and described in U.S. Pat. Nos. 2,205,519 and 3,846,951, issued June 25, 1940 to H. E. Eiber et al. and Nov. 12, 1974 to Paull, respectively.

U.S. Pat. No. 2,205,519 shows a wall or panel structure for mounting and securing glass plates or sheets 27 to a network of horizontal and vertical frame members with attendant offsets, shelves and ledges.

U.S. Pat. No. 3,846,951 shows similar structure with glass sheets 13 secured by arrangements of polymeric gasket material creating undesirable interior offsets and setbacks.

Accordingly it is a principal feature of the present invention to provide a novel wall structure incorporated into a machine enclosure affording a smooth, planar interior surface which collects and sheds readily, metal chips and cutting fluids spewed from the machine in virtually all directions.

It is a further feature of the invention to provide a machine enclosure which is impact resistant, transparent, light in weight and accessible.

A further feature is the provision of an enclosure which provides a novel joint structure sealing cutting oils and other fluids within the enclosure for refining and recycling.

A still further feature of the invention is the provision of a machine enclosure which by virtue of its "tightness" affords an increased level of soundproofness.

SUMMARY OF THE INVENTION

A machine enclosure enhancing certain features of the present invention may comprise a plurality of tubular elements each having a generally rectangular configuration in cross-section, said elements being connected together to define a plurality of generally rectangular, contiguous open frames, a panel of transparent sheet material overlaying the inner side of each frame closing the frame and adhesive means for securing the panels to respective frames comprising a layer of tape having opposed pressure sensitive adhesive surfaces sandwiched between each panel and the inner side of its mating frame to form a smooth, planar interior surface on each frame of said enclosure.

Other features and advantages of the invention will become more apparent from an examination of the succeeding specification when read in conjunction with the appended, in which:

BRIEF DESCRIPTION OF THE DRAWINGS

FIG. 3 shows the machine enclosure seated on a worktable of a metal cutting machine;

FIG. 4 is a plan view of the enclosure;

FIG. 5 is an enlarged view of a portion of FIG. 4; and

FIG. 6 is a sectional view of FIG. 1 in the plane of the line 6—6.

DETAILED DESCRIPTION OF THE INVENTION

Figure 1:
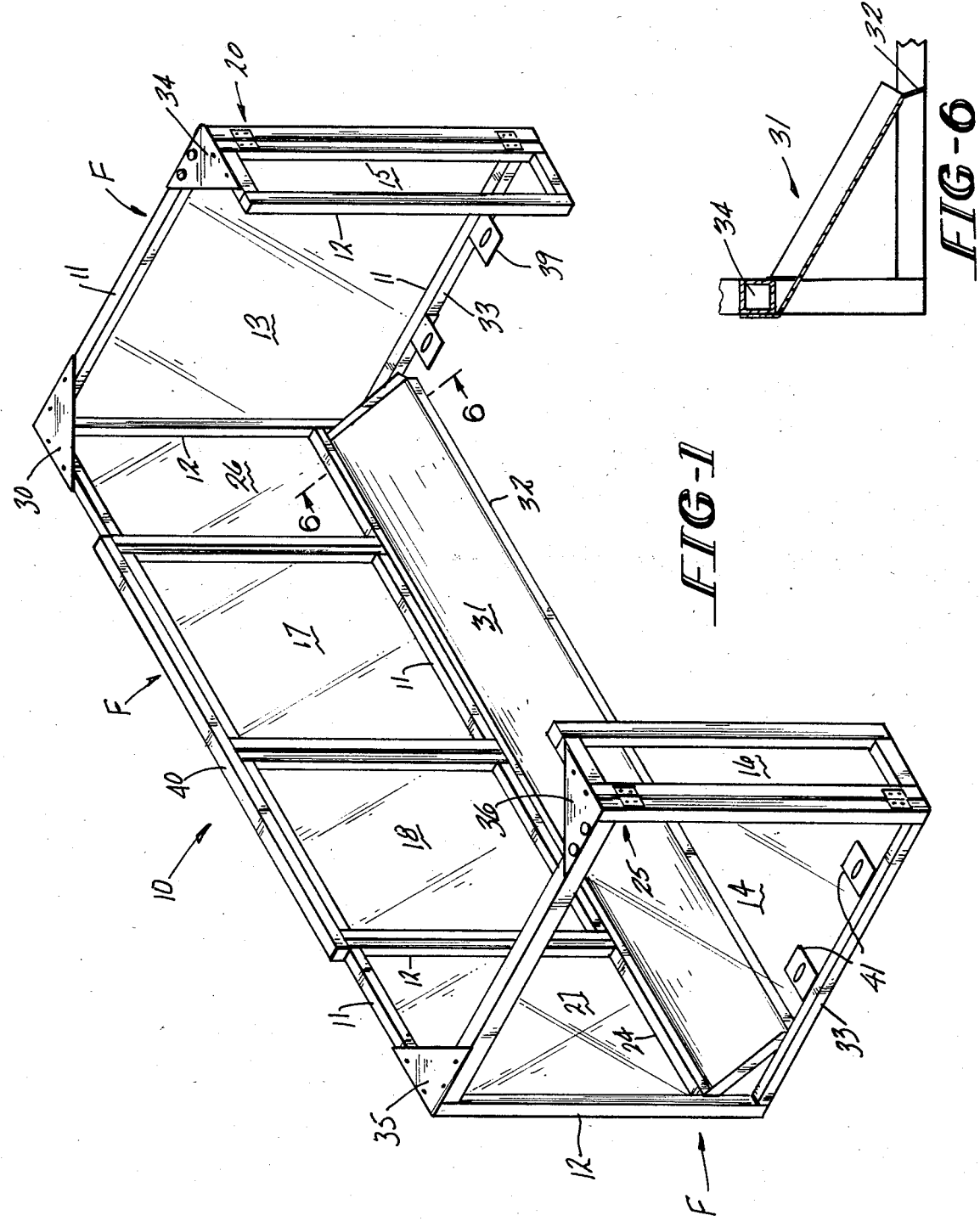
FIG. 1 is a perspective view of a machine enclosure illustrating the principles of the invention.

Referring in detail to the drawings, the reference numeral 10 indicates, generally, a machine enclosure formed of a plurality of generally rectangular frames F each composed of connected horizontal tubular elements such as elements 11—11 and vertical elements such as 12—12.

The frames, in the open condition, i.e., without glazing, are secured together by bolts, clips or other suitable fasteners (not shown) or are hinged together, as desired.

For example, fixed side frames 13 and 14 provide support for movable, short return frames 15 and 16 hinged at 20 and 25, respectively and access frames 17 and 18 are hinged at 19 and 21.

Frame connections at the corners indicated by the reference numerals 22 and 23 are rigid; angle brackets 30 and 35 insure rigidity.

Figure 2:
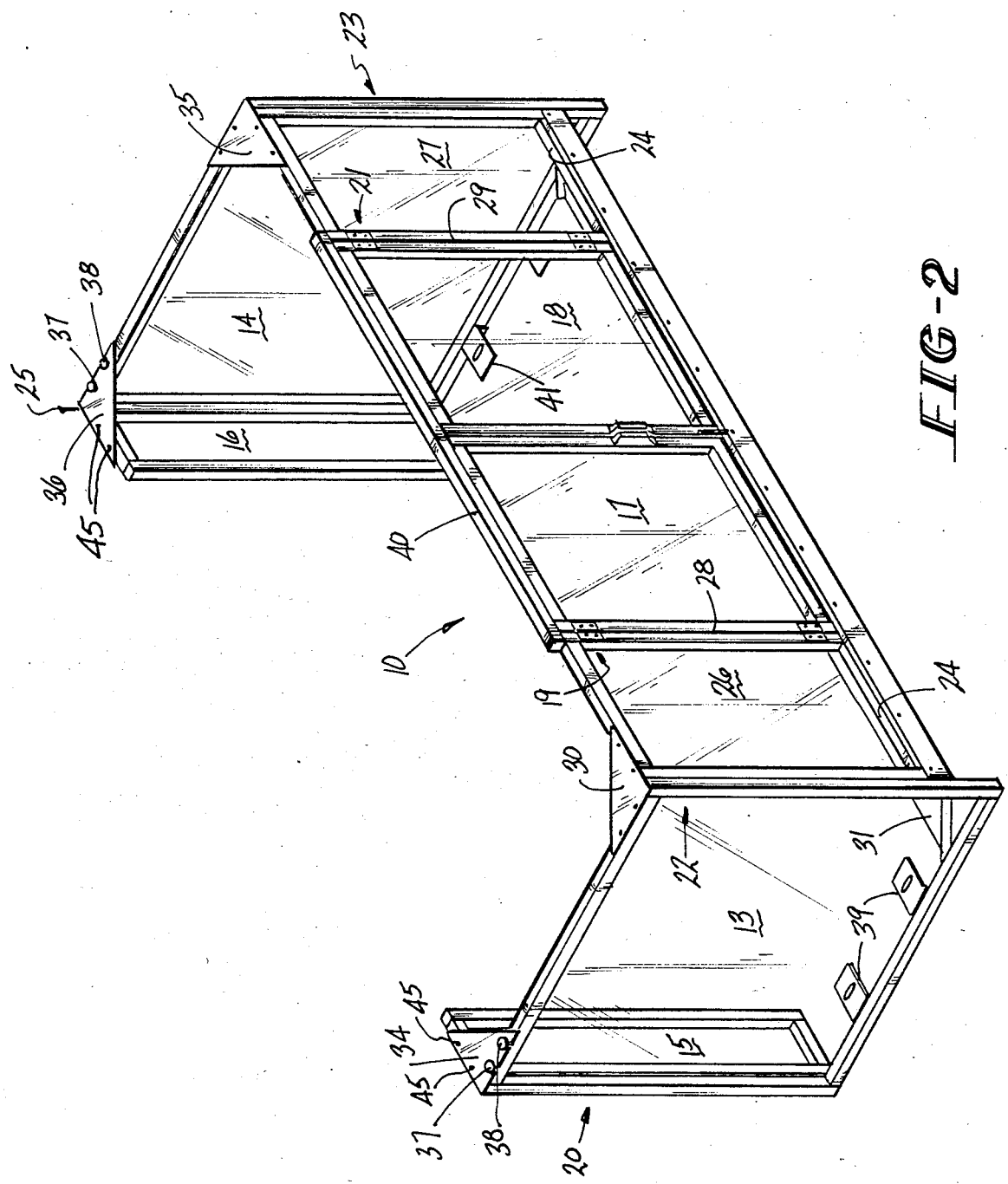
FIG. 2 is a front view, in perspective, of the illustration of FIG. 1.

As is apparent in FIGS. 1 and 2, an elongated support member 24 spans the front of the enclosure; corner frames 26 and 27 are secured to the support member 24 and to side frames 13 and 14.

Access frames 17 and 18 defining access openings are each hinged to mating corner frames 26 and 27.

Note that the hinges at 19 and 21 define primary joints 28 and 29 which are shielded against loss of fluid from the interior of the enclosure 10 to the outer atmosphere in a manner which will become more apparent as this specification proceeds.

As is most noticeable in FIG. 1 the elongated support 24 provides an anchor for drip pan 31 which is canted downwardly toward the worktable W of a machine upon which the enclosure is fitted (see FIG. 3). The face of the drip pan subtends an obtuse angle with the plane of the access or closure frames 17 and 18. A support bar 40 spans across frames 17 and 18 and joins fixed frames 26 and 27 releasably to provide rigidity. Support bar 40 is quickly and readily removable without the use of tools to provide unobstructed access for tool changes.

To enhance the "fluid proof" nature of the enclosure the bottom edge 32 of the drip pan 31 and the bottom edges 33—33 of side frames 13 and 14 are co-planar and therefore make a fairly tight seal with the worktable W of an enclosed machine.

To enhance the seal a compressible gasket may be interposed between the surface of the worktable and the lower periphery of the enclosure. Correspondingly an astragal (not shown) is attached to the bottom of each access frame 17 and 18 cooperating with elongated member 24 to ensure further the integrity of the fluid seal.

Since the short return frames 15 and 16 are hinged at joints 20 and 25 these frames are stabilized by plates 34 and 36 fixed to respective short return frames 15 and 16 by rivets 45. Each plate is formed with notches 37—37 which make frictional contact with mating lugs 38—38 to retain the short frames 15 and 16 releasably in its position shown in FIGS. 1, 2 and 3.

The enclosure 10 is secured releasably to the table W of metal forming machine by means of anchor pads 39—39 and 41—41 having apertures for receiving suitable bolts or other fasteners.

The enclosure 10 is completed in that panels P of transparent sheet material having high impact resistance and secured adhesively to the interior of open frames closing the frames providing a smooth, regular, planar interior surface free of offsets, setbacks or other undesirable obstructions.

While the sheet material is not limited to a particular substance, panels fabricated of a polycarbonate resin are preferred because of its high impact resistance providing a good safety factor.

The panels are secured by sandwiching a tape having high strength pressure sensitive adhesive on opposite sides between one side of the panel and the inner perimeter or border of each frame as indicated by the reference numerals 42—42.

Corner seals are accomplished by butting the panels as at fixed corners 43—43 and at hinged corners 44—44.

Vertical seals such as at joints 46, 47 and 48 are consummated by offsetting or staggering panel joints relative to frame joints as is most apparent in FIGS. 4 and 5.

For purposes of concise claiming the vertical frame joints are referred to as primary joints and the offset panel joints are referred to as secondary joints.

Thus the offset joints create a tortuous path inhibiting if not precluding passage of fluid or particulate matter from the interior of the enclosure to the outer atmosphere.

While a number of high quality high strength tapes having pressure sensitive adhesive on both sides will satisfy the disclosed embodiment the preferred tape is known to the public under the tradename NORSEAL glazing tape. The tape is manufactured by the Norton Sealant Operations, Granville, N.Y. and is described as a high density copolymer based foam substrate with a pressure sensitive adhesive on two sides.

It is anticipated that a wide variety of embodiments may be devised in the present invention without departing from the spirit and scope thereof.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. In an enclosure for automatic metal shaping machinery effective to contain cutting fluids, chips, shavings, broken tools and the like, an improved wall structure providing a smooth, planar interior surface of said enclosure comprising:
a plurality of tubular elements each having a generally rectangular configuration in cross-section, said elements being connected together to define a plurality of generally rectangular, contiguous open frames, a panel of transparent sheet material overlaying the inner side of each frame closing the frame and adhesive means for securing the panels to respective frames comprising a layer of tape having opposed pressure sensitive adhesive surfaces sandwiched between each panel and the inner side of its mating frame to form a smooth, planar interior surface on each frame of said enclosure, a pair of spaced frames are fixed to an elongated support member, a first frame hinged to one spaced frame and a second frame hinged to the other spaced frame, said first and second frames being rotatable from a first position in which said frames abut to define a joint to a second position defining an access opening, the closure panel of one hinged frame overlaying and projecting beyond said joint to provide a seal, a drip pan is positioned within the enclosure, said pan being coextensive with and supported by said elongated support member, said pan being canted and subtending an obtuse angle relative to the plane of said closure panels, a pair of spaced side frames and a bottom edge of the drip pan is coplanar with a bottom margin of said spaced side frames.

2. In an enclosure for automatic metal shaping machinery effective to contain cutting fluids, chips, shavings, broken tools and the like, an improved wall structure providing a smooth, planar interior surface of said enclosure comprising:
a plurality of tubular elements each having a generally rectangular configuration in cross-section, said elements being connected together to define a plurality of generally rectangular, contiguous open frames, a panel of transparent sheet material overlaying the inner side of each frame closing the frame and adhesive means for securing the panels to respective frames comprising a layer of tape having opposed pressure sensitive adhesive surfaces sandwiched between each panel and the inner side of its mating frame to form a smooth, planar interior surface on each frame of said enclosure, a pair of spaced frames are fixed to an elongated support member, a first frame hinged to one spaced frame and a second frame hinged to the other spaced frame, said first and second frames being rotatable from a first position in which said frames abut to define a joint to a second position defining an access opening, the closure panel of one hinged frame overlaying and projecting beyond said joint to provide a seal, a drip pan is positioned within the enclosure, said pan being coextensive with and supported by said elongated support member, said pan being canted and subtending an obtuse angle relative to the plane of said closure panels, a pair of spaced side frames and a bottom edge of the drip pan is coplanar with a bottom margin of said spaced side frames, the spaced side frames support anchor pads for securing the enclosure to a work table of a metal forming machine.

3. In an enclosure for automatic metal shaping machinery effective to contain cutting fluids, chips, shavings, broken tools and the like, an improved wall structure providing a smooth, planar interior surface of said enclosure comprising:
a plurality of tubular elements each having a generally rectangular configuration in cross-section, said elements being connected together to define a plurality of generally rectangular, contiguous open frames, a panel of transparent sheet material overlying the inner side of each frame closing the frame, adhesive means for securing the panels to respective frames comprising a layer of tape having opposed pressure sensitive adhesive surfaces sandwiched between each panel and the inner side of its mating frame to form a smooth, planar interior surface on each frame of said enclosure, a vertical axis hinge means connecting adjacent pairs of frames to provide relative motion between said frames to effect an access opening and two short return frames each connected to and perpendicular to mating side frames, the panels closing said return and side frames abutting one another snugly, said adhesive tape being the principal means for securing said panels to all said frames.

4. In an enclosure for automatic metal shaping machinery effective to contain cutting fluids, chips, shavings, broken tools and the like, an improved wall structure providing a smooth, planar interior surface of said enclosure comprising:

a plurality of tubular elements each having a generally rectangular configuration in cross-section, said elements being connected together to define a plurality of generally rectangular, contiguous open frames, a panel of transparent sheet material overlaying the inner side of each frame closing the frame, adhesive means for securing the panels to respective frames comprising a layer of tape having opposed pressure sensitive adhesive surfaces sandwiched between each panel and the inner side of its mating frame to form a smooth, planar interior surface on each frame of said enclosure, a vertical axis hinge means connecting adjacent pairs of frames to provide relative motion between said frames to effect an access opening, two short return frames each connected to and perpendicular to mating side frames, the panels closing said return and side frames abutting one another snugly, said adhesive tape being the principal means for securing said panels to all said frames, a stabilizing plate having a locking notch formed therein secured to one of said return frame and said mating side frame and a cooperating locking lug secured to the other of said return frame and said side frame, said notch making a releasable, frictional connection with said lug to maintain said perpendicular relationship.

5. In an enclosure for automatic metal shaping machinery effective to contain cutting fluids, chips, shavings, broken tools and the like, an improved wall structure providing a smooth, planar interior surface of said enclosure comprising:

a plurality of tubular elements each having a generally rectangular configuration in cross-section, said elements being connected together to define a plurality of generally rectangular, contiguous open frames, a panel of transparent sheet material overlaying the inner side of each frame closing the frame, adhesive means for securing the panels to respective frames comprising a layer of tape having opposed pressure sensitive adhesive surfaces sandwiched between each panel and the inner side of its mating frame to form a smooth, planar interior surface on each frame of said enclosure, a vertical axis hinge means connecting adjacent pairs of frames to provide relative motion between said frames to effect an access opening, corresponding spaced frames of said adjacent pairs of frames being fixed to an elongated support member, a first frame of said adjacent pair being hinged to one spaced frame, a second frame of said adjacent pair being hinged to the other spaced frame, said first and second frames being rotatable from a first position in which said frames abut to define a joint to a second position defining an access opening, the closure panel of one hinged frame overlaying and projecting beyond said joint to provide a seal and a support means fixed releasably to said spaced frames.

6. The enclosure of claim 5 in which the support means defines an elongated tubular support bar spanning said rotatable frames.

7. The enclosure of claim 5 in which a drip pan is positioned within the enclosure, said pan being coextensive with and supported by said elongated support member, said pan being canted and subtending an obtuse angle relative to the plane of said closure panels.

* * * * *